United States Patent [19]

Chhatwal

[11] Patent Number: 4,645,910
[45] Date of Patent: Feb. 24, 1987

[54] STEAM RESPONSIVE THERMOSTATIC CONTROL ARRANGEMENT FOR ELECTRIC KETTLES

[75] Inventor: K. N. Singh Chhatwal, Bolton, Canada

[73] Assignee: Algonquin Mercantile Corporation, Toronto, Canada

[21] Appl. No.: 787,606

[22] Filed: Oct. 15, 1985

[30] Foreign Application Priority Data

Aug. 30, 1985 [CA] Canada .................................. 489758

[51] Int. Cl.⁴ ........................ H05B 1/02; A47J 27/21; F24H 1/20
[52] U.S. Cl. ..................................... 219/437; 99/281; 219/328; 219/441
[58] Field of Search ............... 219/437, 438, 441, 442, 219/328, 331; 99/281

[56] References Cited

U.S. PATENT DOCUMENTS 4,544,830 10/1985 Miller .................................. 219/437

FOREIGN PATENT DOCUMENTS

| 1274552 | 5/1972 | United Kingdom | 219/437 |
| 1282688 | 7/1972 | United Kingdom | 219/437 |
| 1362775 | 8/1974 | United Kingdom | 219/437 |
| 1384527 | 2/1975 | United Kingdom | 219/437 |

Primary Examiner—Anthony Bartis
Attorney, Agent, or Firm—Sim & McBurney

[57] ABSTRACT

An electric kettle heated by a thermostatically controlled electric heating element includes a conduit for ducting steam produced by boiling water in the kettle to a steam chamber adjacent the thermostatic switch on the kettle for cutting power to the heating element upon sensing steam temperature. A steam exit from the steam chamber is located under the kettle and is spanned by a metal cap external to the exit and supporting a porous, absorbent filter pad through which the exiting steam must pass. The filter pad acts to condense and absorb the exiting steam so that no steam is observed from the bottom of the kettle and the accumulation of condensate on the surface supporting the kettle is minimized or eliminated.

11 Claims, 5 Drawing Figures

U.S. Patent  Feb. 24, 1987  4,645,910
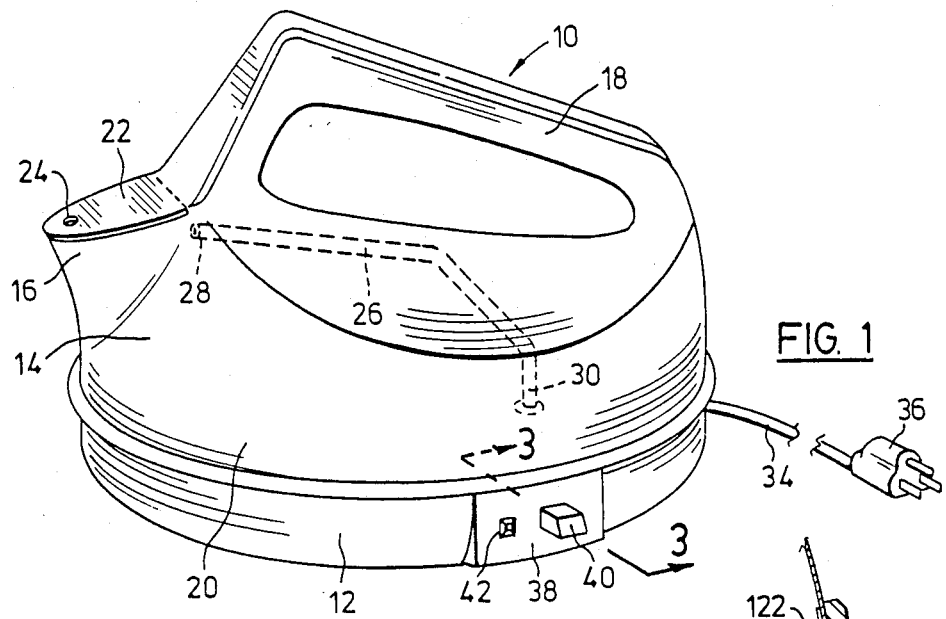
FIG. 1
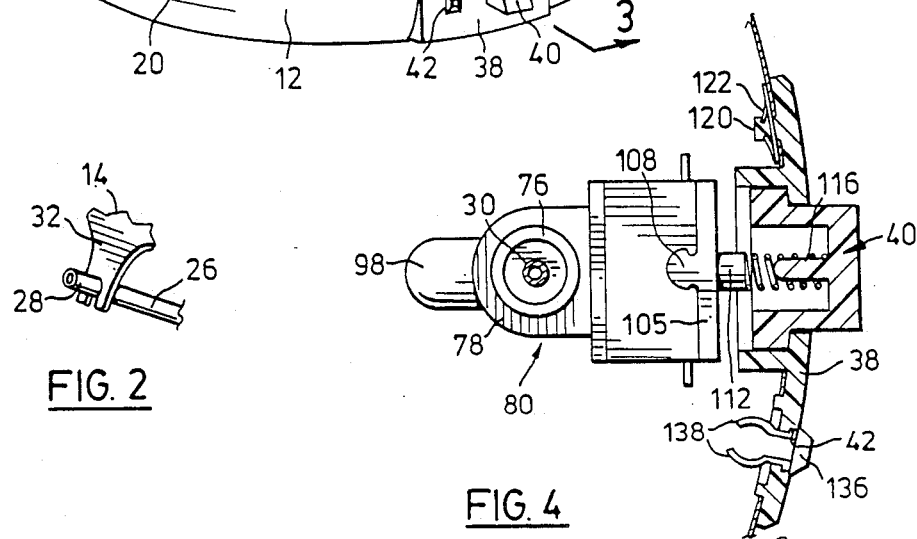
FIG. 2
FIG. 4
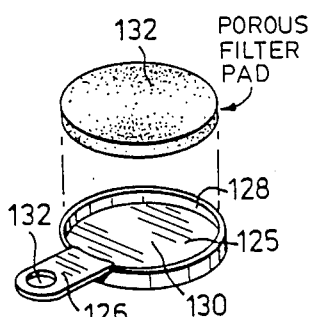
FIG. 5
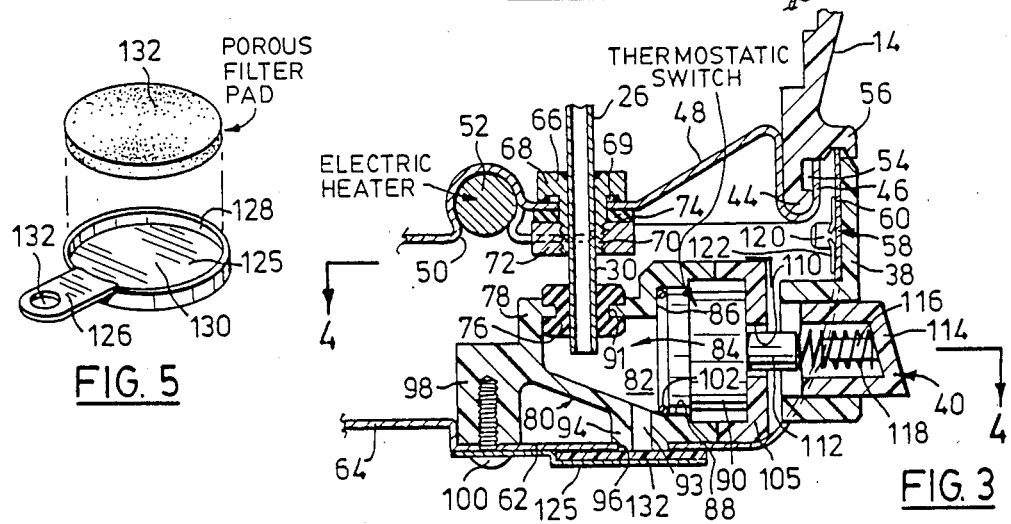
FIG. 3

STEAM RESPONSIVE THERMOSTATIC CONTROL ARRANGEMENT FOR ELECTRIC KETTLES

This invention relates to thermostatically controlled water kettles, and has particularly to do with an improvement in such a kettle, in which steam from the boiling water is ducted along a conduit to a steam chamber adjacent a thermostatic switch that controls power to the heating element of the kettle.

BACKGROUND OF THIS INVENTION

Kettles with thermostatic controls are already well known. One form of thermostatic control is mandatory for kettles in many parts of the world. This is the thermostat which cuts power when a kettle without any water in it is plugged in or switched on, or when the kettle has boiled dry. The heating element rapidly heats the metal base of the water chamber to a very high temperature, and the thermostat senses this high temperature and responds by cutting power to the element.

Another form of thermostat in kettles of this kind is intended to cut power to the element after water in the chamber has been brought to boil. It is known to provide a conduit, typically in the form of a copper tube, from a location above the surface of the water in a filled kettle to a location adjacent a thermostat which is adapted to cut power to the element when it senses the high temperature due to the steam. It will be appreciated that the steam must be allowed to pass by the thermostat, and that the conduit bringing the steam to the thermostat cannot be blind or closed, otherwise the steam temperature would not reach the thermostat. Thus, in the known kettles having this latter kind of thermostat, the steam is simply allowed to pass adjacent the thermostat and then to exit from the kettle into the ambient air. In these known kettles, one can readily see the location where the steam is escaping after having passed by the thermostat. Such a construction has three prominent disadvantages. The first is that the user, when seeing the steam blowing out of the kettle at a location other than the spout, may think that the kettle is defective or is malfunctioning in some way. The second disadvantage relates to the high temperature of the escaping steam, and the danger this presents to the user.

A third disadvantage relates to the risk that the escaping steam will condense on a table surface or other nearby surface, thus causing staining, marking or warping.

GENERAL DESCRIPTION OF THIS INVENTION

In view of the foregoing disadvantages of conventional constructions, it is an aspect of this invention to provide a thermostatically controlled electric kettle in which steam from the water chamber ducted to a steam chamber adjacent a thermostat passes from the steam chamber to the atmosphere through a special provision which "traps" the steam, this provision being in a safe location under the kettle, and being such as to suppress the appearance of escaping steam.

More particularly, this invention provides an improvement in an electric kettle which has a conduit for ducting steam produced by boiling water in the kettle to a location in contact with a thermostatic switch which is adapted to cut power to the kettle upon sensing steam temperature. The improvement incorporates means defining a steam exit from the location to the exterior of the kettle, a metal cap external to the kettle and spanning the exit, and a porous absorbent filter pad supported in the metal cap, such that steam exiting from the location must pass through the pad.

Additionally, this invention provides an electric kettle which incorporates a water chamber for boiling water, an electric element for heating water in the chamber, and a thermostatic switch adapted to cut power to the element upon sensing steam temperature. A steam chamber is located in contact with the thermostatic switch, and a conduit is provided for ducting steam from the water chamber to the steam chamber. A steam exit is defined from the steam chamber to the exterior of the kettle, and a metal cap external to the kettle spans the exit. A porous, absorbent filter pad covers the exit and is held in place by the metal cap, such that steam exiting from the steam chamber is regulated as it passes through the filter pad.

Finally, this invention provides a molded plastic element for use in an electric kettle which incorporates a thermostatic switch for cutting power after water in the kettle has begun to boil. The element incorporates means defining a recess having a mouth opening at a step into a cylindrical bore adapted to receive the thermostatic switch, so that the mouth is closed by the thermostatic switch. Thus, the recess constitutes a closed chamber. There is a first opening in a wall of the chamber for receiving a grommet surrounding a steam inlet tube, and a second opening in a wall of the chamber through which steam can exit from the chamber.

GENERAL DESCRIPTION OF THE DRAWINGS

One embodiment of this invention is illustrated in the accompanying drawings, in which like numerals denote like parts throughout the several views, and in which:

FIG. 1 is a perspective view of a kettle embodying the present invention;

FIG. 2 is a partial perspective view of a clip provision for holding a steam conduit within the kettle of FIG. 1;

FIG. 3 is a vertical sectional view taken at the line 3—3 in FIG. 1;

FIG. 4 is a horizontal sectional view taken at the line 4—4 in FIG. 3; and

FIG. 5 is an exploded perspective view of some components of the assembly.

DETAILED DESCRIPTION OF THE DRAWINGS

Attention is first directed to FIG. 1 which shows an electric kettle 10 having a base 12 and an upper portion 14, the upper portion incorporating a spout 16, a handle 18, and a body 20. A closure 22 closes the spout 16, and contains an aperture 24 for the escape of steam. If desired, there may be associated with the aperture 24 a whistle-producing device, so that a signal may be given when the water is boiling.

Within the body 20 is a copper tube 26 constituting a conduit having an upstream end 28 located above the highest water level within the kettle, and having a downstream end 30 passing downwardly through the bottom of the water chamber defined by the body 20 and the base 12.

As seen in FIG. 2, the body 20 incorporates a downwardly projecting fork 32 into which the upstream end 28 of the tube 26 can snap and be held in place.

The kettle 10 includes a typical electrical cord 34 and a plug 36, which may be of the detachable kind.

Located along one side of the base 12 is a plate 38 through which projects a reset button 40. The plate 38 also has an opening 42 through which a pilot light is visible. The latter structure will be described in greater detail with reference to FIGS. 3 and 4, to which attention is now directed.

As seen in FIG. 3, the body 20 defines along its lower rim a downwardly projecting rib 44 adapted to be received in a U-shaped fold 46 around the periphery of a heating plate 48 which defines the bottom of the water chamber. The heating plate 48 has a recess 50 in which a heating element 52 is captured. The heating element 52 transmits heat by contact to the heating plate 48, and the latter passes the heat into the water so that it may be boiled. The fold 46 is intended to be crimped into a recess 54 provided in the rib 44, although the drawing of FIG. 3 shows the situation prior to crimping.

Also defined along the bottom edge of the upper body 14 is an outwardly projecting flange 56 having a recess in its underside for receiving the upper edge of a cup-shaped metal base 58. In addition to an upstanding side wall 60, the base 58 also includes a bottom wall 62 which is centrally upwardly stepped at 64.

The bottom end 30 of the tube 26 can be seen in FIG. 3, and it can further be seen that the bottom end 30 is soldered through an adaptor 66, made of brass or the like, the adaptor having an outwardly projecting flange 68 with a recess 69 on its underside, the recess 69 being adapted to receive an O-ring for the purpose of providing a tight seal against the heating plate 48. The adaptor 66 includes a downwardly projecting threaded shank 70 which threadably receives a nut 72 and a washer 74.

As can be seen, the bottom end 30 of the tube 26 projects downwardly below the adaptor 66, and passes through a grommet 76 in the wall 78 of a molded plastic element 80 which will now be described in greater detail.

The element 80 is shaped to define a recess 82 having a mouth 84 which opens rightwardly at a step 86 into a cylindrical bore 88 that is adapted to receive a thermostatic switch 90 in such a way that the mouth 84 is closed by the thermostatic switch 90, whereby the recess 82 is converted into a closed chamber.

In addition to an opening 91 for receiving the grommet 76, there is also a short exit passage 93 from the recess 82 (closed chamber), the passage 93 constituting a further opening and extending through a boss 94 that is received in turn within an aperture 96 in the bottom wall 62 of the base 58.

The element 80 further has a downwardly projecting portion 98 by which the element 80 can be fastened in place within the kettle. Specifically, the portion 98 has an upwardly extending bore for receiving a self-tapping screw 100 by which it can be fastened tightly against the bottom wall 62.

It will be seen that the thermostatic switch rests leftwardly against an O-ring 102 lodged in the step 86, thus completely sealing the recess 82 except for the steam entrance along the tube 26 and except for the steam exit along the passage 93.

The thermostat 90 is held in place by a closure 105 having two ears 108 adapted to snap into correspondingly configured recesses in the wall of the element 80 defining the cylindrical bore 88. The closure 105 has a central aperture 110 through which a reset post 112, forming part of the thermostat 90, can project.

The thermostat 90 is of the kind which will open its circuit upon sensing the right degree of heat, but which requires physical pressure to be reset. One suitable such thermostat is manufactured by Therm-o-disc, under type 36TM01.

Both FIGS. 3 and 4 show the plate 38, and the push button 40. The push button 40 is somewhat rectangular in configuration, with a downwardly and outwardly sloping forward wall 114. The push button 40 is also hollow, and contains internally an inwardly directed post 116 around which a compression spring 118 is located. The compression spring bears inwardly against the post 112, and its sole purpose is to bias the push button 40 outwardly.

When the thermostat 90 snaps to its circuit-open position, the post 112 moves to the right. In order to reset the thermostat 90, the post 112 must be shoved back leftwardly. This is the function of the push button 40, which contacts the post 112 by means of the post 116.

The plate 38 has a plurality of bosses 120 which interact with gripping washers 122 in order to hold the plate 38 in place.

It will be appreciated then that steam enters the chamber 82 from the open bottom end 30 of the tube 26, moves past the thermostat 90, thus activating the same, and then exits from the chamber 82 through the passage 93. It will be appreciated that, if the steam were simply allowed to run out along the passage 93, it would impinge against the table or counter on which the kettle was located, and would certainly result in the accumulation of water, with the attendant danger of marking, staining, etc. In order to prevent this difficulty, there is provided a metal cap 125, having a securement tab 126 projecting therefrom. The cap 125 has an upstanding sidewall 128 and a round bottom wall 130. The securement tab 126 has an aperture 126A and is adapted to be held in place by the machine screw 100, as can be seen in FIG. 3.

The cap 125 holds in place a porous, absorbent filter pad 132 which is located to cover the exit from the passage 93, such that steam exiting from the chamber 82 must pass through the filter pad 132.

With the construction just described, it is observed that the thermostat functions quite well, but no steam can be observed escaping from the bottom of the kettle. Moreover, accumulation of condensate on the surface supporting the kettle is minimized or eliminated entirely.

It appears that these advantages derive from the fact that the filter pad acts as a condensing location for the steam while not plugging the bottom opening of the passage 93. It also acts to regulate the flow of steam to the thermostat. Thus, steam can continue to move through the passage 93 and condense in the filter pad 132. The metal cap 125 has two functions. The first is of course to hold the filter pad 132 in place, and to protect the same. However, the metal cap 125 also functions as a heat sink to withdraw heat from the filter pad 132, and to pass it by conduction to the bottom wall 62 of the base 58.

The upper rim of the metal cap 125 is not intended to contact the bottom wall 62, but is spaced slightly therefrom.

It will be appreciated that the thermostat opens the circuit to the electric heating element very shortly after boiling has begun, whereupon boiling ceases. For this reason only a small amount of steam needs to be disposed of by the filter pad 132 and the metal cap 125. Because of the relatively elevated temperature of both of these elements immediately following the boiling of the water, the hot condensate within the filter pad 132 will evaporate away through the gap between the metal cap 125 and the bottom wall 62. Thus, under normal use the filter pad 132 does not become saturated with moisture.

It has been found that a suitable material for the metal cap 125 is stainless steel, and a suitable material for the filter pad 132 is an open-celled synthetic sponge.

As seen in FIG. 4, a translucent plastic clip 136 is snapped into place in the opening 42, the clip defining a fork 138 for holding a neon pilot bulb.

While one embodiment of this invention has been illustrated in the accompanying drawings and described hereinabove, it will be evident to those skilled in the art that changes and modifications may be made therein without departing from the essence of this invention, as set forth in the appended claims.

The embodiments of the invention in which an exclusive property or privilege is claimed are defined as follows:

1. In an electric kettle having a conduit for ducting steam produced by boiling water in the kettle to a location adjacent a thermostatic switch of the kettle adapted to cut power to the kettle upon sensing steam temperature, the improvement which comprises:

means defining a steam exit from said location to the exterior of the kettle, a metal cap external to the kettle and spanning the exit, the metal cap supporting a porous, absorbent filter pad through which the steam exiting from said location must pass.

2. The invention claimed in claim 1, in which the cap is of stainless steel and the pad is of a sponge material.

3. An electric kettle, comprising:
a water chamber for boiling water,
an electric heating element for heating water in said chamber,
a thermostatic switch adapted to cut power to said element upon sensing steam temperature,
a steam chamber in contact with said thermostatic switch,
a conduit for ducting steam from said water chamber to said steam chamber,
means defining a steam exit from said steam chamber to the exterior of said kettle,
a metal cap external to the kettle and spanning the exit, and
a porous, absorbent filter pad covering the exit and held in place by the metal cap, such that steam exiting from the steam chamber is regulated as it passes through the filter pad.

4. The invention claimed in claim 3, in which the cap is of stainless steel and the pad is of sponge material.

5. The invention claimed in claim 3, in which the kettle has a base, and in which the exit, the cap and the filter pad are all on the underside of the kettle base.

6. The invention claimed in claim 3, in which the thermostatic switch requires physical pressure to be reset, and in which the kettle includes a push-button for applying such physical pressure.

7. The invention claimed in claim 3, in which the conduit is a length of copper tube heaving a steam entrance end above the normal level of water in said water chamber.

8. A molded plastic element for use in an electric kettle that incorporates a thermostatic switch for cutting power after water in the kettle has begun to boil, the element comprising:

means defining a recess having a mouth opening at a step into a cylindrical bore adapted to receive a thermostatic switch, such that the mouth is closed by the thermostatic switch, whereby the recess constitutes a closed chamber,
a first opening in a wall of the chamber for receiving a grommet adapted to surround a steam inlet tube, and
a second opening in a wall of the chamber through which steam can exit from the chamber.

9. The element in claim 8, which defines a boss through which the second opening passes, the boss adapted to be receivable in an aperture in an electric kettle.

10. The element claimed in claim 9, further having a portion remote from said boss by which the element can be fastened in place within a kettle.

11. The element claimed in claim 8 in combination with a closure adapted to snap against the element and hold a thermostatic switch against the recess mouth with an O-ring between the switch and the step.

* * * * *